United States Patent Office 3,464,263
Patented Sept. 2, 1969

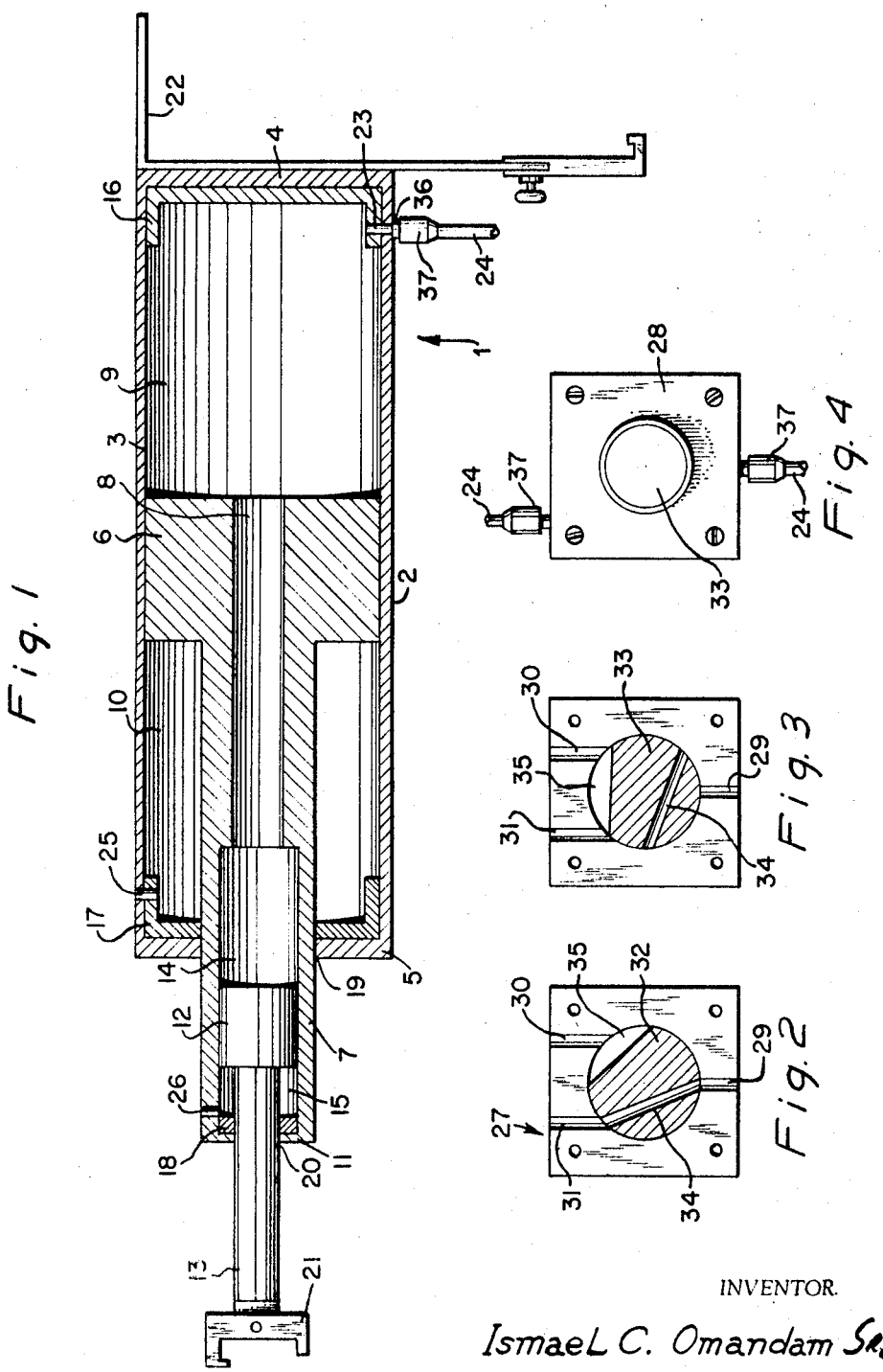

3,464,263
TESTING DEVICE FOR MECHANICAL BRAKES
Ismael C. Omandam, Sr., Aiea, Oahu, Hawaii
(1659 Nahula St., Wahiawa, Hawaii 96786)
Filed Dec. 23, 1965, Ser. No. 515,925
Int. Cl. G01l 5/28
U.S. Cl. 73—132                                    3 Claims

ABSTRACT OF THE DISCLOSURE

A testing device for mechanical brakes of a motor vehicle for use in adjusting the brakes through bleeding of air from the brake system which can be performed by a single operator without having a helper inside the vehicle pumping the brake pedal. The device comprises a cylindrical housing, containing sliding pistons, to be positioned during use between the driver seat and the brake pedal of a vehicle and, additionally, a valve selector unit which may be remotely operated by the operator while working on the brake, the unit being connected to the cylindrical housing and, also, to a pressurized air supply tank by a flexible tubing.

---

This invention relates to testing devices, and more particularly to testing devices for mechanical brakes.

It is therefore the main purpose of this invention to provide a testing device for mechanical brakes for an automobile wherein the testing and adjusting of mechanical brakes may be accomplished by one man.

Another object of this invention is to provide a testing device for mechanical brakes wherein a long, flexible hose is used for supplying air to the testing device.

Another object object of this invention is to provide a testing device for mechanical brakes having a main and an auxiliary piston which allows to perform brake testing not only on standard type vehicles but also on heavy-duty type of vehicles.

Another object of this invention is to provide a testing device for mechanical brakes which is inexpensive to manufacture and provides maximum utility to its user.

Other objects and advantages of this invention will become apparent from consideration of the following detailed description taken in connection with the accompanying drawing wherein a satisfactory embodiment of the invention is now shown. However, it is to be understood that the invention is not limited to the details disclosed but includes all such variations and modifications as fall within the spirit of the invention and the scope of the appended claims.

In the drawing:

FIGURE 1 is a vertical view of this invention shown in elevation and in section;

FIGURES 2 and 3 show various valve positions;

FIGURE 4 is an end view of the valve.

According to this invention, the testing device comprises a piston and cylinder unit 1 capable of being removably connected between a foot-operated brake pedal (not shown) and the driver seat of a motor vehicle (not shown) with flexible tubing 24 remotely connecting a valve selector unit 27 to the piston and cylinder unit 1 the tubing being of sufficient length to allow a workman to operate the valve selector unit 27 while he is in the vicinity of the brakes of the motor vehicle. Additionally, the valve selector unit 27 is connected by flexible tubing to a pressurized air supply tank (not shown).

The piston and cylinder unit 1 is provided with a cylindrical housing 2 enclosing a cylindrical chamber 3 having a solid end wall 4 and an opposite end wall 5. The cylindrical housing 2 slideably accommodates therein a first piston 6 connected to a first piston rod 7 both having a longitudinal central bore 8 extending therethrough. The first piston 6 effectively divides the cylindrical chamber into a first chamber 9 and a second chamber 10. The longitudinal central bore 8 is open at one end directly communicating with first chamber 9 of the cylindrical chamber 3, and has an end wall 11 at its other end. The longitudinal central bore 8 slideably accommodates a second piston 12 connected to a second piston rod 13. The second piston 12 effectively divides the longitudinal central bore 8 into an inner chamber 14 and an outer chamber 15. A first piston stop 16 is positioned within the first chamber 9 against the solid end wall 4 of the cylindrical chamber 3. A second piston stop 17 is positioned within the second chamber 10 against the opposite end wall 5 of the cylindrical chamber 3. A third piston stop 18 is positioned within the outer chamber 15 against the end wall 11 of the longitudinal central bore 8. The second piston stop 17 and the opposite end wall 5 both have a circular opening 19 through which the first piston rod 7 extends. The third piston stop 18 and the end wall 11 both have a central opening 20 through which the second piston rod 13 extends. The second piston rod 13 has a hook means 21 connected to its extended end for removable securement of the second piston rod 13 to a foot-operated brake pedal of a vehicle. A 90 degree angle bracket means 22 is connected to the cylindrical housing 2 adjacent the solid end wall 4 of the cylindrical chamber 3 having an adjustable lock located at the bottom of the bracket means for removable securement of the cylindrical housing 2 to the driver seat of the motor vehicle.

The cylindrical housing 2 has a first opening 23, adapted to receive one end of a flexible tubing 24, positioned adjacent the solid end wall 4 of the cylindrical chamber 3 to allow movement of pressurized air in and out of the first chamber 9, whereby the pressurized air directly contacts the first piston 6 and the second piston 12. The cylindrical housing 2 has a second opening 25 positioned adjacent the opposite end wall 5 of the cylindrical chamber 3 to allow movement of air in and out of the second chamber 10. The first piston rod 7 has a third opening 26 positioned adjacent the end wall 11 of the longitudinal central bore 8 to allow movement of air in and out of the outer chamber 15. The second and third openings 25, 26 prevent a surge in piston movement.

The valve selector unit 27, connected by flexible tubing 24 to the first opening 23 in the cylindrical housing 2, is adapted to allow the flow of pressurized air from an air supply tank (not shown) to the first chamber 9 of the piston and cylinder unit 1 causing pistons 6, 12 to be driven forward thus overriding the spring tension of the brake pedal. Further, the valve selector unit 27 is adapted to stop the flow of pressurized air and to allow the exhaust of air from the first chamber 9 whereby the forward drive of the pistons 6, 12 collapses with the spring tension on the brake pedal restoring it back to its original state.

The valve selector unit 27 comprises a housing 28 having a circular hollow 32 therein. Channels 29, 30, 31 are incorporated in the housing 28 running from the circular hollow 32 to the peripheral edges of housing 28. A circular body 33, having channels 34, 35 incorporated therein is rotatably positioned within the circular hollow 32 of housing 28 for alignment of the respective channels of housing 28 with the respective channels of the circular body 33 depending upon whether the operator desires to introduce pressurized air into the piston and cylinder unit 1 or release pressurized air therefrom. The channels 29, 31 and the first opening 23 in the cylindrical housing 2 are fitted with male insert members 36. The male insert members 36 are fitted with removable female socket members 37. Flexible tubing 24 connects the female socket member 37 of channel 31 to the female socket member 37 of the first opening 23. Also, flexible tubing 24 connects the female socket member 37 of channel 29 to a pressurized air supply tank (not shown). Therefore, when the operator aligns channels 29, 34, 31 of the valve selector unit 27, pressurized air will flow from the air supply tank to the first chamber 9 of the piston and cylinder unit 1 forcing pistons 6, 12 to move forward overriding the spring tension of the brake pedal. Furthermore, when the operator aligns channels 30, 35, 31 of the valve selector unit 27, the flow of pressurized air from the air supply tank will be stopped and pressurized air in the first chamber 9 of the piston and cylinder unit 1 will escape through channel 31 whereby the forward drive of the pistons 6, 12 collapses with the spring tension on the brake pedal restoring it back to its normal state. This sequence may be repeated a number of times.

What I now claim is:

1. A testing device for mechanical brakes of a motor vehicle comprising:
   a piston and cylinder unit capable of being removably connected between a foot-operated brake pedal and the driver seat of a motor vehicle;
   a valve selector unit comprising a housing a circular hollow therein with three channels incorporated in said housing, wherein said circular hollow is rotatably positioned a circular body with two other channels incorporated therein, whereby the operator, by rotation of said circular body, may selectively align respective channels to determine the operation of the piston and cylinder unit;
   a flexible tubing remotely connecting said valve selector unit to said piston and cylinder unit and being of sufficient length to allow a workman to operate said valve selector unit while in the vicinity of the brakes of said motor vehicle;
   said valve selector unit being additionally connected to a pressurized air supply tank;
   said piston and cylinder unit comprising a cylindrical housing enclosing a cylindrical chamber therewithin having a solid end wall and an opposite end wall;
   a first piston, connected to a first piston rod, slideable within said cylindrical chamber, causing division of said cylindrical chamber into a first chamber and a second chamber;
   said first piston and first piston rod having a longitudinal central bore extending therethrough, said longitudinal central bore having an end wall;
   a second piston, connected to a second piston rod, slideable within said longitudinal central bore, causing division of said longitudinal central bore into an inner chamber and an outer chamber, whereby said inner chamber opens into said first chamber of said cylindrical chamber;
   a first piston stop positioned within first chamber against said solid end wall of said cylindrical chamber;
   a second piston stop positioned within said second chamber against said opposite end wall of said cylindrical chamber;
   said second piston stop and said opposite end wall both having a circular opening through which said first piston rod extends;
   a third piston stop within said outer chamber against said end wall of said longitudinal central bore;
   said third piston stop and said end wall both having a central opening through which said second piston rod extends;
   hook means connected to the extended end of said second piston rod for removable securement of said second piston rod to said foot-operated brake pedal;
   bracket means connected to said cylindrical housing adjacent said solid end wall of said cylindrical chamber for removable securement of said housing to said driver seat;
   said cylindrical housing having a first opening, adapted to receive one end of said flexible tubing, positioned adjacent said solid end wall of said cylindrical chamber to allow movement of pressurized air in and out of said first chamber, whereby said pressurized air contacts directly said first piston and said second piston;
   said cylindrical housing having a second opening positioned adjacent said opposite end wall of said cylindrical chamber to allow movement of air in and out of said second chamber;
   said first piston rod having a third opening positioned adjacent said end wall of said longitudinal central bore to allow movement of air in and out of said outer chamber; and
   said valve selector unit adapted to allow the flow of pressurized air from said air supply tank of said first chamber of said piston and cylinder unit causing said pistons to be driven forward thus overriding the spring tension of the brake, and further adapted to stop the flow of pressurized air and to allow the exhaust of air from said first chamber whereby the forward drive of said pistons collapses with the spring tension on the brake restoring it back to its original state.

2. A testing device as defined in claim 1 wherein said bracket means comprises a 90 degree angle connected to said cylindrical housing adjacent said solid end wall of said cylindrical chamber, and an adjustable lock installed at the bottom of said bracket for removable securement of said cylindrical housing to said driver seat.

3. A testing device as defined in claim 1 wherein said valve selector unit
   said channels incorporated in said housing of said valve selector unit extend from said circular hollow to the peripheral edges of said housing; a first channel of said channels being tapped with a male insert which is fitted with a removable female socket connected to other flexible tubing, said other flexible tubing, being connected to said pressurized air supply tank, allowing communication of pressurized air from said supply tank to said valve selector unit; a second channel of said channels being tapped with a male insert which is fitted with a removable female socket connected to said flexible tubing, said flexible tubing being connected to said cylindrical housing allowing communication of pressurized air between said valve selector unit and said cylindrical housing; a third channel of said channels adapted to allow the exhaust of pressurized air communicated from the cylindrical housing to said valve selector unit; said other channels incorporated in said circular body extend across said body; a fourth channel of said other channels adapted to establish an air passage between said first and second channels of said housing for communication of pressurized air between said air supply tank and said cylindrical housing; a fifth channel of said other channels adapted to establish an air passage between said second and third channels of said housing for communication of pressurized air between said cylindrical housing and said valve selector unit whereby said air exhausts through said third channel in this position and during said position said first channel serves as a shut off valve to stop the flow of pressurized air from said air supply tank to said cylindrical housing.

References Cited
UNITED STATES PATENTS

| | | | |
|---|---|---|---|
| 732,142 | 6/1903 | Tuggle et al. | 92—53 XR |
| 1,898,376 | 2/1933 | McCulloch et al. | 73—132 |
| 2,933,070 | 4/1960 | Trümper et al. | 92—52 XR |

RICHARD C. QUEISSER, Primary Examiner

JOHN R. FLANAGAN, Assistant Examiner

U.S. Cl. X.R.

92—53